United States Patent [19]

Gum et al.

[11] Patent Number: 4,598,364
[45] Date of Patent: Jul. 1, 1986

[54] EFFICIENT TRACE METHOD ADAPTABLE TO MULTIPROCESSORS

[75] Inventors: Peter H. Gum, Poughkeepsie; Arthur L. Levin, Pleasant Valley; Ronald M. Smith, Wappingers Falls, all of N.Y.; John H. Wilson, Austin, Tex.

[73] Assignee: International Business Machines Corporation, Armonk, N.Y.

[21] Appl. No.: 509,129

[22] Filed: Jun. 29, 1983

[51] Int. Cl.⁴ .............................................. G06F 11/30
[52] U.S. Cl. .................................... 364/300; 364/200
[58] Field of Search ... 364/200 MS File, 900 MS File, 364/300; 371/19

[56] References Cited

U.S. PATENT DOCUMENTS

| | | | |
|---|---|---|---|
| 4,205,370 | 5/1980 | Hirtle | 364/200 |
| 4,268,904 | 5/1981 | Suzuki et al. | 364/200 |
| 4,435,759 | 3/1984 | Baum et al. | 364/200 |
| 4,462,077 | 7/1984 | York | 364/300 |

OTHER PUBLICATIONS

Birney et al, "Trace", IBM Technical Disclosure Bulletin, vol. 20, No. 7, Dec. 1977, pp. 2561-2562.

Primary Examiner—James D. Thomas
Assistant Examiner—Thomas Lee
Attorney, Agent, or Firm—Bernard M. Goldman

[57] ABSTRACT

The disclosure describes a separate trace table for each CPU in an MP to avoid inter-CPU interference in making trace table entries for explicit and implicit tracing instructions enabled by flag bits in a control register (CR). Explicit tracing entries are made for an enabled explicit tracing instruction. Implicit tracing entries are made for predetermined instructions (when enabled for tracing) which do not have tracing as their primary purpose. A storage operand of the trace instruction contains a disablement field and optionally may contain an enablement-controlling class field to improve the integrity of traceable programs. A time stamp and range of general register contents is provided in each trace table entry for a tracing instruction. The time stamp enables all trace tables in an MP system to be later merged into a single trace table whenever required.

18 Claims, 7 Drawing Figures

FIG. 2  TRACE-ENTRY FORMATS

31-BIT BRANCH

| 1 | BRANCH ADDRESS |
|---|---|
| 0  1 | 31 |

24-BIT BRANCH

| 00000000 | BRANCH ADDRESS |
|---|---|
| 0        8 | 31 |

SET SECONDARY ASN

| 00010000 | 00000000 | NEW SASN |
|---|---|---|
| 0 | 8        1 | 31 |

PROGRAM CALL

| 00100001 | PSW KEY | PC NUMBER | GR 14 AFTER |
|---|---|---|---|
| 0 | 8 | 12 | 32                                 63 |

PROGRAM TRANSFER

| 00110001 | PSW KEY | 0000 | NEW PASN | R₂ BEFORE |
|---|---|---|---|---|
| 0 | 8 | 12 | 16 | 32                          63 |

TRACE

| 0111 | N | 00000000 | TOD-CLOCK BITS 16-63 |
|---|---|---|---|
| 0 | 4 | 8 | 16                                63 |

| TRACE OPERAND | $(R_2)—(R_3)$ |
|---|---|
| 64 | 96                    95 + 32(N+1) |

FIG. 3

FIG. 7  S/370 TRACING OPERATION
(PRIOR ART)

FIG. 6 (WRITE TR TT ENTRY)

EFFICIENT TRACE METHOD ADAPTABLE TO MULTIPROCESSORS

The subject invention relates to a program tracing and monitoring method which can operate on any CPU of a multiprocessor (MP) without tracing interaction between CPUs in the MP concurrently doing program tracing.

BACKGROUND

Tracing routines in software and microcode have been provided in the prior art for the purpose of tracing through a program to assist in locating errors or bugs therein. Software monitoring routines and instructions (e.g. S/370 monitor call instruction) also are in the prior art for the purpose of storing hardware and software states sensed during the execution of programs on a system, in order to enable analysis of the results to measure system performance and enable tuning of the resource configuration of the system.

Tracing assists in the determination of system problems by providing a snapshot record in storage of certain types of states existing when a location in a program is reached.

The instruction support for software monitoring has some similarity to tracing instruction support. However their functions are different, i.e. software diagnostics for tracing, and system performance measurement for monitoring. Software monitors universally have the problem of distorting the operations of the system they are measuring, because a monitor software routine or instruction interrupts the program it is monitoring to thereby compete with the program being measured for hardware resources in the system. This distortion is unimportant to the diagnostic function of tracing. For this reason, monitoring is most accurately done by special hardware which is normally externally connected to a system, but may be built into a system such as by the invention disclosed and claimed in a patent application Ser. No. 509,128, entitled "Internally Distributed Monitoring System" filed on the same day as the subject application and having the same assignee.

Many types of tracing programs are currently available. However, the name, tracing program, covers diverse areas in the examination of computer programs. One tracing program may be strikingly different from another, and each may be useable for a different purpose. Some tracing programs only observe a particular type of situation, event, or kind of information. Many prior tracing programs are not user-directed and are not flexible; they can not be tailored to a particular computer installation or to a particular program execution.

Some prior tracing programs were limited in their tracing function to branch points only, interrupt points only, predetermined sequences of instructions, or other prespecified events.

Some prior tracing programs operate at relatively slow rates; for example, it is common when storing all traced data for such prior programs to take, on the average, 100 times longer than their untraced execution time. Most prior tracing programs overlay their limited output areas which they may use for buffering to an output device, or they may have the results remain in main storage for analysis.

A tracing program that totally controls all other programs on a computing system is disclosed and claimed in U.S. Pat. No. 3,707,724 to J. L. Dellheim entitled "Program Execution Tracing System Improvements".

Dual address space (DAS) tracing in S/370 is described on pages 4-11 through 4-15 in the IBM S/370 Principles of Operation, Form No. GA22-7000-8. It describes a tracing architecture that uses fixed length entries written into one trace table in main storage used by all CPUs in the system.

Also special purpose trace instructions have been used as assists to MVS/370 programs on S/370 systems. Each generates a fixed length trace entry of 32 bytes in the system trace table. These special purpose trace instructions are:

TRACE SVC INTERRUPTION
TRACE PROGRAM INTERRUPTION
TRACE INITIAL SRB DISPATCH
TRACE I/O INTERRUPTION
TRACE TASK DISPATCH
TRACE SVC RETURN
TRACE SVC INTERRUPTION

The fixed length format limits tracing performance when more tracing data is needed to be collected than would fit in the fixed length format. Then the tracing needs to be supplemented by a tracing program to collect the additional data.

Figure 7:
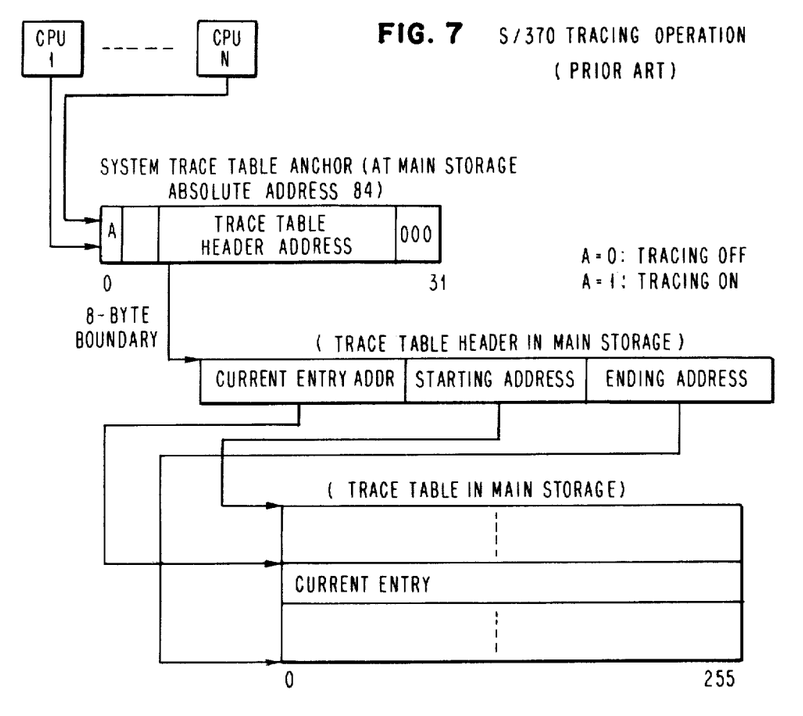
FIG. 7 represents the prior art System/370 tracing architecture useable by a plurality of CPU's.

FIG. 7 illustrates the prior art S/370 tracing method, in which all CPU's 1 through N in an MP use the same system trace table. They all access the system trace table through an anchor word at absolute address 84 in main storage. Flag bit A in the anchor at this location indicates whether system tracing is enabled or not. If enabled, a trace-table header address in the anchor word is used to access a trace-table header in main storage, which contains the current trace address to be used, and also contains the boundaries of the system trace table in starting and ending address fields. Significant overhead occurs for each tracing entry made, in order to compare the updated current trace-entry address with the ending address and with the end of the 4KB page frame currently being used since another page frame must be allocated before the trace table can be continued beyond the current page frame.

In more detail for the prior S/370, tracing for all CPU's 1 through N is enabled by bit A being set to 1. Then traceable instructions executed by all CPU's 1 through N write fixed-length trace entries into the single system trace table in the following manner:

1. Any one or more of CPU's 1-N executing a traceable instruction will access location 84 to read the trace-table header address. This causes no contention among simultaneously requesting CPU's, because only read requests are made.

2. Each CPU which is permitted to access the trace table must change the current-entry address to the next entry value for the next CPU permitted to make a trace entry. In order to maintain the integrity of the trace table, only one CPU at a time is allowed to read the current-entry address and then change the current-entry address value. Thus, only one of simultaneously contending CPUs is permitted to access this one-word address at a time to perform an interlocked update on the current-entry address. This is usually done with a compare and swap (CS) instruction, which serializes all concurrently requesting CPUs. Each requesting CPU failing to gain access goes into a CS wait loop until it successfully executes its CS instruction, after which it reads and then changes the current-entry address. Also another type of very significant inter-CPU interference can exist when the successful CS read request occurs; and that is the requested current-entry address may be found only in a store-in cache of another CPU which last changed that address value. Then before the read request can be performed, the line containing that address must be castout of the other CPU's cache and line fetched into the requesting CPU cache, which may be done either through main storage or cache-to-cache if available in the MP.

3. After a CS successful CPU reads the current-entry address, it will be unique to that CPU because each next CPU to read the current-entry address will get a different address (incremented by the prior successful CPU). Hence there is no interlock contention among the tracing CPUs in accessing the trace table itself to record its trace data. However, there is significant inter-CPU cache contention among the CPUs, because their cache line sizes are much longer than the one-word current-entry address field.

Hence, both steps 2 and 3 have a high probability of resulting in cache interference with another CPU. The resulting MP performance degradation may be very significant.

For step 3, although each CPU is storing its trace entry into a different 32-byte location, inter-CPU interference results if the cache-line size is more than 32 bytes wherein all or part of the required 32 byte entry is part of a line (e.g. 128 bytes) in another CPUs cache. For example in an IBM 3081 CPU, the cache-line size is 128 bytes which spans across four trace table entries.

Also, two fundamental architectural problems exist with the S/370 fixed-length trace entries, which are: (1) some entries cannot contain all of the available information required, and (2) some entries waste unused space. The variable-length entries provided by the subject invention permit each trace entry to include all available required information without waste.

SUMMARY OF THE INVENTION

Objects of this invention are to support program tracing in any one or more CPUs of an MP with:

1. No interference among the CPUs doing tracing to significantly improve MP performance.

2. No tracing interruption to an instruction stream being traced (as long as there is no page boundary crossing) to significantly improve the performance of any CPU doing tracing.

3. A general-purpose trace instruction that supports explicit tracing of a general type by being able to capture the contents of any number of general registers in the CPU.

4. Each CPU having control over implicit tracing by selected branching and address space instructions and explicit tracing by trace instructions.

5. Variable-length entries in a trace table to improve the content quality of some trace entries and efficiently use storage space.

6. Console control over the enablement/disablement of predetermined classes of explicit tracing instructions (which may be in different programs) without needing to modify any program or any operand data.

7. Individual disablement control over each explicit trace instruction in any program by modifying operand data, but without needing to modify any program.

8. Significantly reduced overhead for page-end boundary checking needed for making entries in any CPU trace table.

The invention supports a separate trace table for each CPU in a MP to avoid inter-CPU interference in making trace table entries. Also, the invention provides a time stamp in each explicit trace table entry to enable all trace tables in a MP system to be later merged into a single trace table whenever required.

Inter-CPU interference is avoided by providing each CPU with its own trace table and its own interface to its trace table. That is, no other CPU can use a trace table interface or make entries in a trace table. Two types of inter-CPU interference are avoided by this invention compared to the prior S/370 tracing, which are:

1. No serializing interference occurs among the CPUs by not having any common trace-table header.

2. No cross-cache interference occurs, since each CPU accesses a different interface and a different trace table. For example in the prior S/370 system trace table, a header field or trace entry required by a CPU may be part of a cache line in another CPU's cache; whereby the line must first be castout to the requesting CPUs cache before the next entry address or new trace table entry can be written.

Two types of tracing may cause entries to be made in a CPUs trace table: (1) implicit tracing of (a) a set of branch instructions, and (b) a set of ASN (address space number) instructions, and (2) explicit tracing by a novel general trace instruction. These sets may be less than all available branch instructions or less than all available ASN instructions.

In order to identify the length and type of each trace entry when examining a trace table, an entry identifier (ID) code is put into the first field of each trace entry.

Branch tracing, ASN tracing, and explicit tracing may be separately enabled in each CPU.

When branch tracing is enabled and a traceable branch instruction is executed, an entry is made in the CPU's trace table if the branch is taken by the instruction. The ID code put into the trace entry also indicates which addressing mode is in effect after the branch is taken.

When ASN tracing is enabled and a traceable ASN instruction is executed, an entry is made in the CPU's trace table.

When explicit tracing is enabled and a trace instruction is executed, an entry is made in the CPU's trace table. A trace instruction entry includes a time stamp taken from a system time-of-day (TOD) clock, a storage operand fetched by the executing trace instruction, contents of specified general registers, and a number field (N) which is one less than the number of specified general registers.

The time stamp is valuable in the trace instruction entries due to the way this instruction is used for tracing. A time stamp is less valuable in the trace entries for the traceable instructions; and it is preferable for them not to contain a time stamp in a tradeoff between containing the time stamp and saving the storage space in the trace table by not having them use the time stamp.

Control over both implicit and explicit tracing is done in this invention on a CPU basis in a MP system by using one of the control registers (CRs) in each CPU. This tracing control register contains flag fields for controlling the enablement of the different types of tracing in a trace table for that CPU. The CR also contains a trace entry address field which stores the address of the next entry to be made in the trace table by the next executed enabled traceable or tracing instruction. These CR control fields may comprise:

1. A branch-trace-control bit (B) which controls whether implicit tracing for a set of branch instructions is enabled or disabled. If the bit is zero, branch tracing is disabled; if the bit is one, branch tracing is enabled.

2. ASN trace control bit (A) which controls whether implicit tracing for a set of ASN instructions is enabled or disabled. If the bit is zero, ASN tracing is disabled; if the bit is one, ASN tracing is enabled.

3. An explicit trace control bit (E) controls whether tracing by the trace instruction is enabled or disabled. If the bit is zero, explicit tracing is disabled which causes the trace instruction to be executed as a no-operation (NOP); if the bit is one, the execution of the trace instruction creates an entry in the trace table, except that no entry is made when a disablement flag bit (T) in a storage operand of the particular trace instruction indicates it is disabled.

The flag fields within any control register can be enabled in any combination or all be enabled or disabled. Also the tracing control registers for the different CPU's in a MP can have their flag fields set independently of each other, whereby tracing can be disabled in some CPU's and enabled in other CPU's in any combination.

When a traceable instruction is decoded for execution by a CPU and the corresponding implicit tracing function is enabled, a trace entry with an appropriate format is made in that CPU's trace table. The real address of each next trace entry is directly obtained from the CPU's tracing CR address field. After it is fetched, the address in the control register is increased by the size of the variable entry being created, in order to provide the address to the next entry in that trace table.

Whenever a trace entry would cross a page boundary in main storage (e.g. the next address in the CR would be outside the current page frame), it is detected by a carry propagated into the page boundary bit position (e.g. bit 19 for a 4KB page), a trace-table exception signal is generated, and the instruction execution is nullified. After the next page frame is obtained, its address is put into the trace-controlling CR, and the instruction is re-executed to generate the trace entry at the beginning of the new page frame.

The use of variable length entries: (1) allows all entries to contain all of the trace information required, and (2) avoids wasted space. The length of an entry is signalled by an identifier code field at the beginning of each trace table entry, which in some cases is followed by a byte count of the length of a variable field in that type of entry.

Each decoded trace instruction fetches an operand from storage. A disablement bit position (T) in the storage operand is provided to allow any user to selectively disable any trace instruction after the instructions have been assembled into a program without having the user access the assembled program, which would be dangerous to its integrity. That is, the user only needs to access and change its operand data in main storage to selectively set on or off the disablement bits (T) in the operands of those trace instructions in the related program. When the disablement bit position in an operand is disabled, there is no trace entry to be made by the corresponding instruction, even though explicit tracing is enabled in the CPU's tracing control register.

It is possible for a plurality of trace instructions to address the same storage operand, in which case this plurality of trace instructions is controlled as a subset by one operand disablement flag T. But by having a unique operand location for each tracing instruction, each trace instruction can be individually controlled by a flag bit T.

Normally, the trace instructions may be "seeded" throughout a programming module during its compilation or assembly, and thereafter they are not easily located or changed. Their operands, on the other hand, can be assembled into tables in a data module that can be easily located and dynamically modified.

With individual explicit instruction disabling, a user can dynamically control the tracing activities by changing the T bits to meet changing criteria, without impact to existing program modules. This provision for simple adjustment to accommodate unforeseen or changing needs: (1) contributes to the utility of a tracing facility, and (2) provides flexibility in: (a) dynamically establishing just how much tracing is to be done, and (b) in apportioning the tracing among the components of a programming system.

This invention also allows a console operator to control the selection of which of plural classes of trace instructions will generate trace entries. This can be done after a class field is set in each storage operand of those trace instructions to be console controlled. By setting a different class (e.g. 0 to 15) in the storage operands in different programs, or in different parts of a program, console control can be exercised by the console controlling the form of a TR mask set into the CPU to enable selected classes of the trace instructions.

Prior tracing mechanisms, by comparison, often have provided relatively too few or too many trace table entries for particular circumstances, and are less amenable to adjustment to bring them into balance with needs.

Operating system performance often can be improved by changing the interface operation between modules by changing Supervisor Call (SVC) instructions to Branch and Link instructions to eliminate the hardware interrupt that the SVC causes. When such a change is made, the conventional branch trace information (generated by the SVC interruption handler program) is no longer obtained. Thus, as more and more Branch and Link interfaces are coded in the system, less and less trace information is gathered. The branch trace function of this invention provides the ability to regain the trace information without program interruption, except at occasional page boundary crossings. Since branch tracing is separately enabled in the tracing control register, the tracing information is gathered only when problems occur in this part of the system.

The foregoing and other objects, features, and advantages of the invention will be apparent from the following detailed description of a preferred embodiment of the invention, as illustrated in the accompanying drawings.

DETAILED DESCRIPTION OF THE PREFERRED EMBODIMENT

Figure 1:
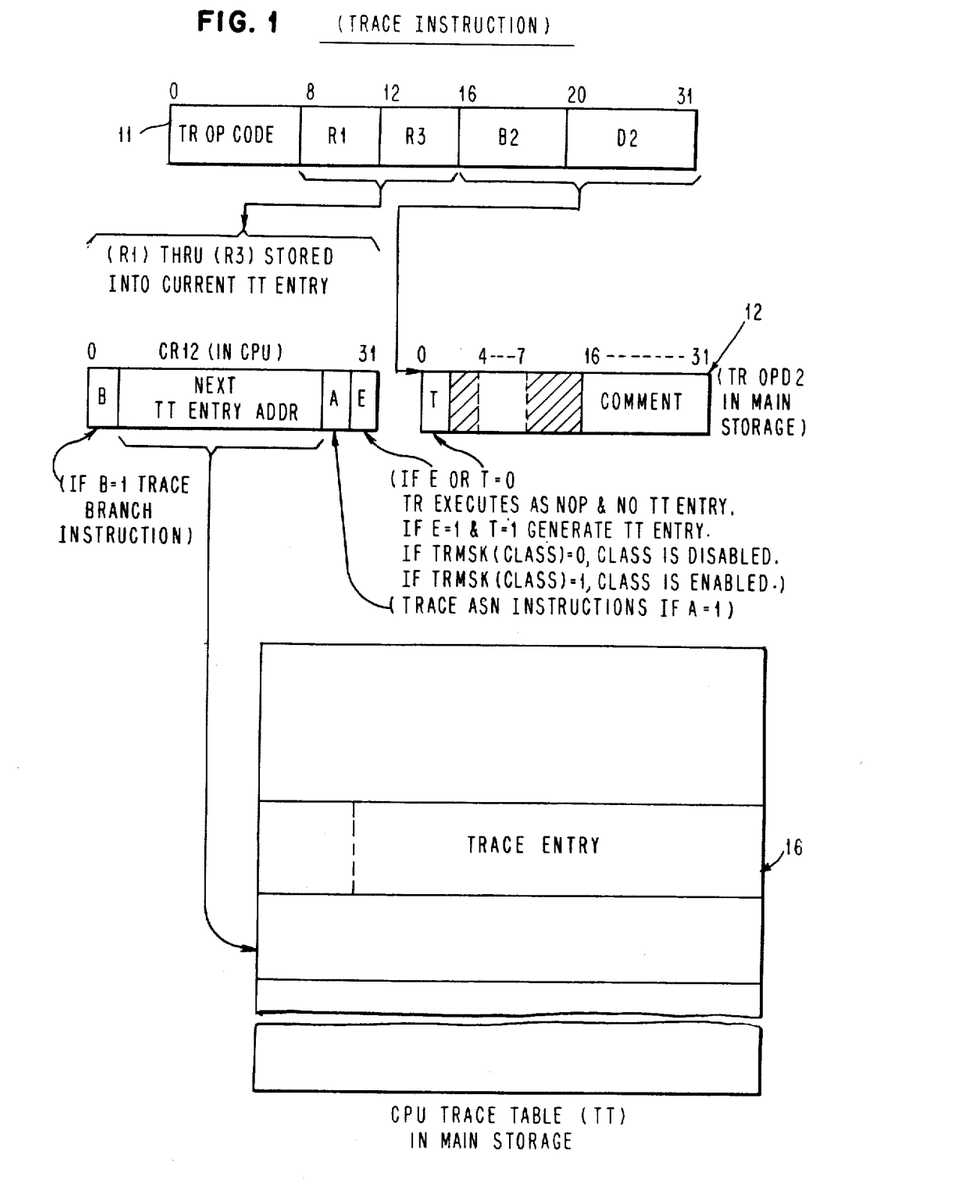
FIG. 1 illustrates the architecture for a trace instruction which is a subject of the present application.

FIG. 1 illustrates the architecture for a trace instruction 11 comprising a special operation code (TR OP CODE) and three operand addresses, of which R1 and R3 define the bounds of a range of general purpose registers (GRs) in a System/370 CPU from R1 through R3 with wraparound. The second operand address comprises B2 and D2, which are combined to provide a logical address (which may be a virtual address) of the second operand (OPD2) which is a 32 bit word in main storage.

Figure 4:
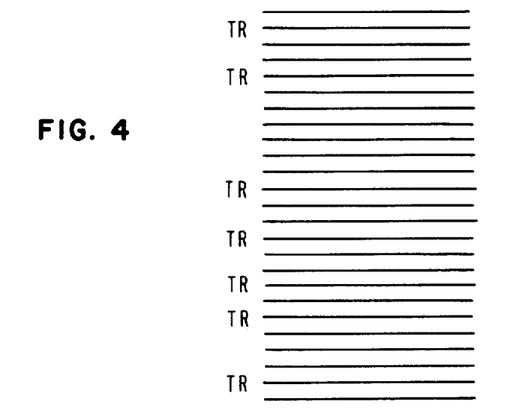
FIG. 4 represents an instruction stream assembled to contain trace instructions.

Any number of trace (TR) instructions of the type shown as 11 in FIG. 1 may be inserted at selected tracing locations in an instruction stream of any program written in compliance with the IBM System/370 Extended Architecture (XA), see the IBM System/370 Extended Architecture Principles of Operation, Form No. SA22-7085. FIG. 4 illustrates an example of a program having TR instructions sprinkled throughout.

One of the control registers (CRs) of the 16 in each CPU (designated as CR12) is used to control the tracing operation. In CR12, there are three flag fields designated as B, A, and E, which are each a single bit in length. Also, CR12 contains an address field designated as the next TT (trace table) entry address. Flag bit B (when set to a one state) enables the implicit tracing of the following set of S/370XA instructions:

BRANCH AND LINK (BALR only) when the R2 field is not zero.

BRANCH AND SAVE (BASR only) when the R2 field is not zero.

BRANCH AND SAVE AND SET MODE when the R2 field is not zero.

Figure 2:
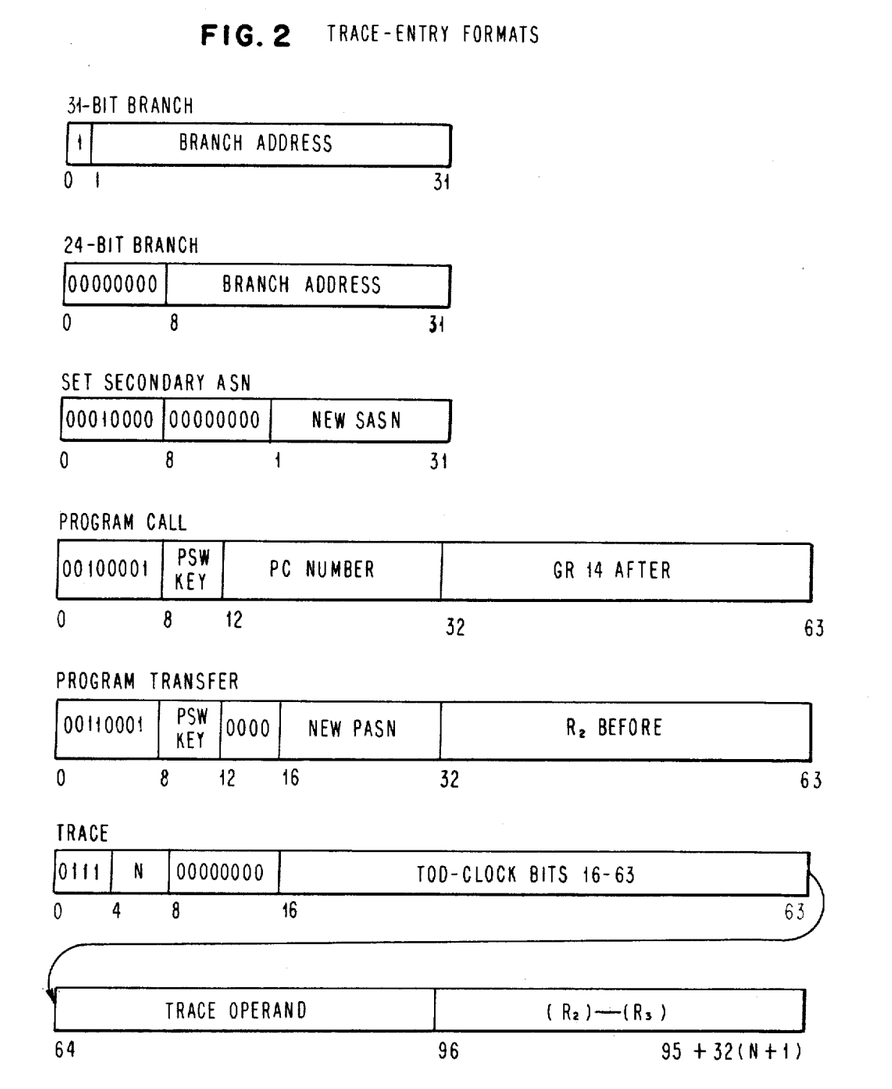
FIG. 2 illustrates different types of variable length entries which may be made in any CPU trace table for implicit tracing by certain branch and ASN instructions and explicit tracing by the trace instruction shown in FIG. 1.

When their tracing is enabled by B being one, each time one of these branch instructions is executed, a trace entry is generated and inserted into a trace table for the respective CPU in main storage as a 31 bit branch entry or a 24 bit branch entry of the type shown in FIG. 2 in accordance with the S/370XA address mode existing after a branch is taken.

In a similar manner, when flag bit A is set to one, it enables the implicit tracing of the following set of S/370XA address space ASN instructions:

PROGRAM CALL
PROGRAM TRANSFER
SET SECONDARY ASN

When bit A is set to 1, an entry is made in the trace table upon execution of any of these ASN instructions. The format of the trace entries respectively generated in the trace table for these ASN instructions also is illustrated in FIG. 2 with the name of the respective instruction.

The setting to a one state of either flag bit B or A or both enables implicit tracing, because a trace table entry is then generated implicitly as part of the execution process whenever any instruction in these two sets is executed. It is implicit, because the programmer who put these instructions into a program need not have been aware of their later tracing use.

On the other hand, flag bit E in CR12 controls explicit tracing by each trace instruction of the type represented as 11 in FIG. 1, which will generate entries in the trace table having the format labeled TRACE in FIG. 2. The use of the TR instruction by a programmer is explicit because the programmer will knowingly put it in a program for tracing purposes. While explicit tracing is enabled (i.e. flag bit E is set to 1) and a trace instruction 11 is encountered in an executing program, any particular trace instruction may still be disabled and not generate any trace entry if its flag bit T is set to zero state in the second operand of the trace instruction. However, if flag bit T is set to a one state, then the instruction is enabled and a trace entry is generated and put into the trace table.

An optional class control facility may also be provided in the CPU to control class enablement and disablement of trace instructions. For example, all of the trace instructions in one routine may be designated as class 1 while all trace instructions in another routine may be designated as class 2. Then if the class facility is available in the CPU, the console operator can set a trace mask into a trace mask register in the CPU (shown as item 22 in FIG. 3) to, for example, enable class 1 and disable class 2. This will cause only class 1 trace instructions to put entries in the trace table, and class 2 trace instructions will then execute as no-operations (NOPs) and not provide any trace entries.

The integrity of a program capable of being traced is enhanced by putting special tracing enablement/disablement control into the storage operand of each trace instruction. This is done by having the second operand data located in a different program control section than the program module containing the trace instructions 11. Then the user can later control the disablement of any trace instruction setting either or both of its flag bit T, and/or its class field (if any) without disturbing the program module. By avoiding having the user access the program, its integrity is maintained, since it could be destroyed if users were allowed to reassemble the module for controlling tracing.

Also, a comment field is provided in the storage operand which a user may also set, in contemplation of doing a particular trace without accessing the program itself.

Figure 3:
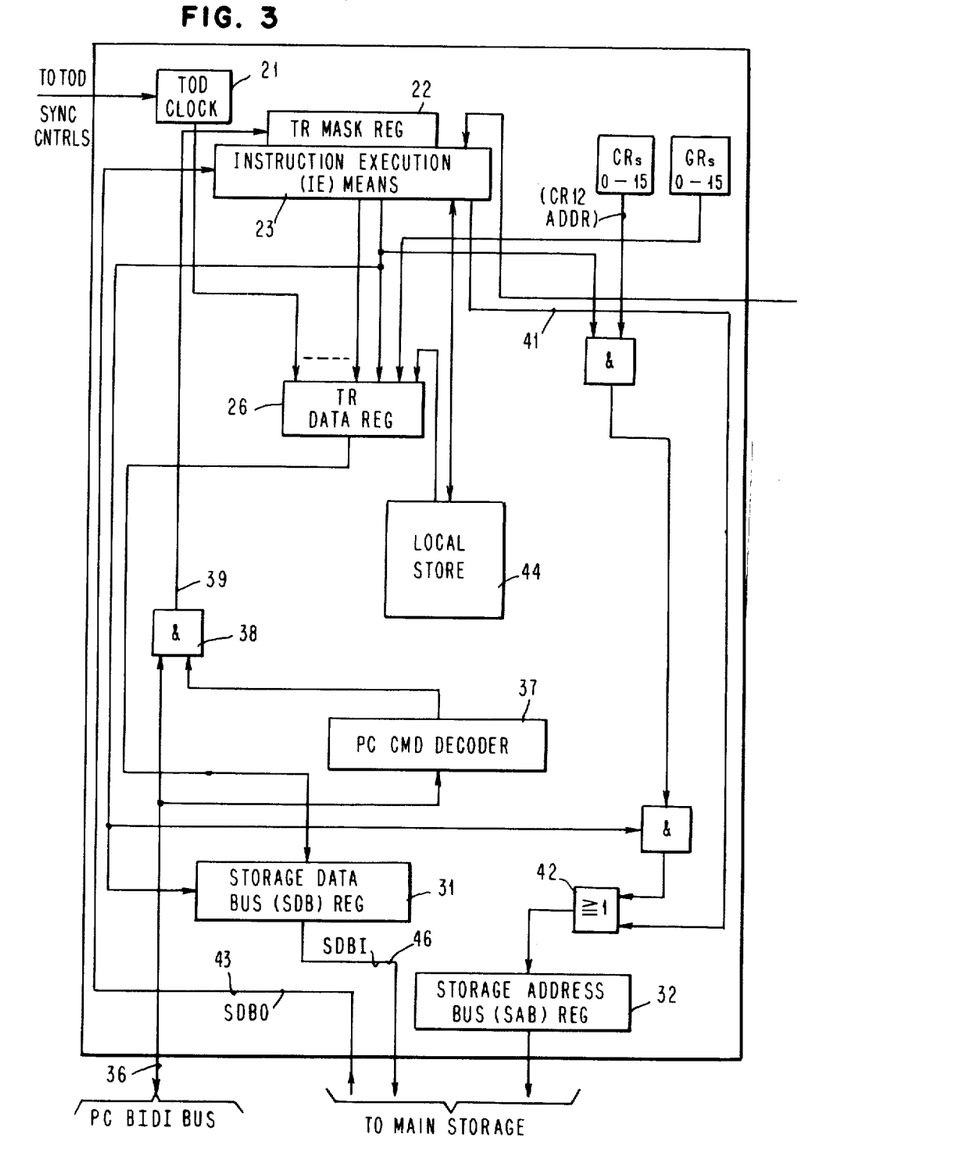
FIG. 3 is a logic diagram of hardware which may be found in a CPU to support the tracing operation by traceable and trace instructions.

FIG. 3 illustrates those circuits within each CPU which are important to the subject invention. It is obvious that any CPU contains a tremendous amount of circuitry of a conventional nature to perform normal functions of the CPU not important is describing an embodiment of the subject invention, and they are not shown or discussed herein because they would clutter the communication of the inventive concepts. Thus, in FIG. 3 each CPU has a time-of-day (TOD) clock 21, instruction execution (IE) means 23, TR mask register 22, control registers (CRs) 0 through 15 (of which the CR12 output is shown), GRs (general purpose registers) 0 through 15, TR mask register 22, TR data register 26, storage data bus (SDB) register 31, storage address bus (SAB) register 32, etc., and interconnecting circuitry representations.

The TR mask register 22 is an optional feature of a CPU which is only needed to support the class tracing control previously described, which may not exist on other CPU's. If it does not exist, the class field in OPD2 shown in FIG. 1 cannot be used, and is ignored by the CPU. If the TR mask register 22 does exist in the CPU, it is set by a set trace mask command from the system console (not shown), which is called a processor controller (PC) in some systems. See application Ser. No.

509,128 filed on the same day as this application by the same assignee for a description of a PC connected to a plurality of CPU's in an MP having TR mask registers set by set trace mask commands.

The CPU receives commands from the PC on a bidirectional bus 36, which is connected to a PC command decoder 37 and an AND gate 38. When decoder 37 receives and decodes a set trace mask command, it enables gate 38 to pass a trace mask (then being sent on PC bus 36) of 16 bits which are loaded into the trace mask register 22 of the CPU.

A different TR mask command is recognized by each CPU in the system, so that the PC can differently set the TR masks in the different CPUs of a MP.

Thus, a set TR mask command to any CPU loads its TR mask register 22 via bus 36 from the PC.

The instruction execution (IE) means 23 of each CPU interprets and executes the instruction stream of the CPU in a conventional manner. Additionally, the IE executes the novel implicit tracing and explicit tracing (TR) instruction as described herein.

A system performance advantage of this invention is that a CPU does not interrupt the instruction stream when using the implicit and explicit tracing taught by this invention. (Occasionally an interrupt is required to allocate a new page to continue the trace table when the current page becomes filled with trace entries. Page allocation type interrupts are well known in virtual address systems, such as in the IBM Multiple Virtual Storage (MVS) control programming. Note that a paging interrupt is not a tracing interrupt.)

The CPU execution of a TR instruction in the IE in FIG. 3 involves the IE providing the TR second operand absolute address (after any translation and prefixing) on bus 41 via an OR circuit 42 to SAB (storage address bus) register 32 in order to access the second operand in a CPU cache (not shown), or if not in the cache, from main storage. (Cache and storage access controls may be conventional, which are well known in the art.) A storage data bus out (SDBO) 43 receives the operand data from the cache (or from main storage) and transfers it to IE 23. The IE temporarily stores the second operand in its local store 44.

Figure 5:
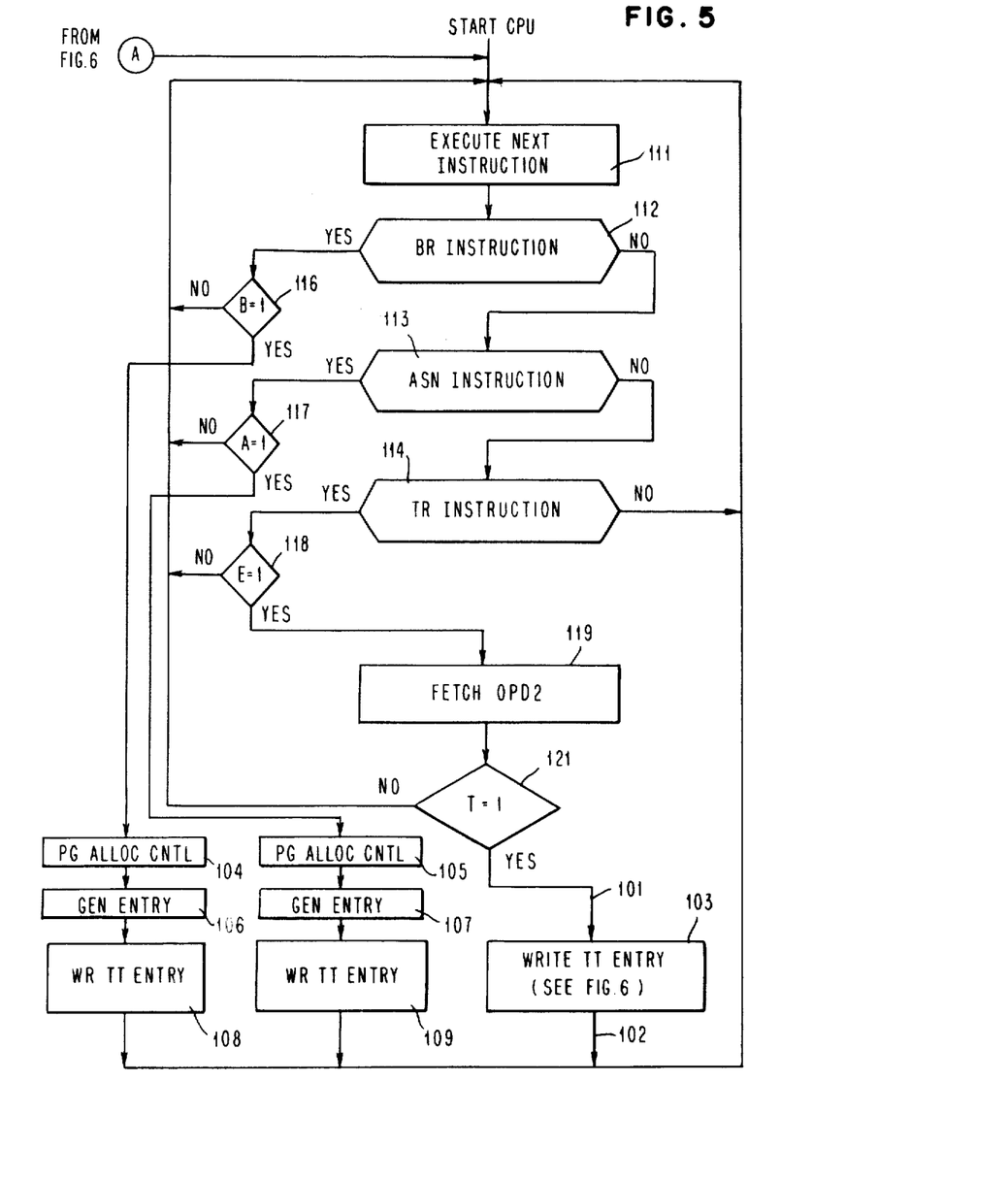
FIG. 5 is a flow diagram of a method which may be used by the subject invention.
Figure 6:
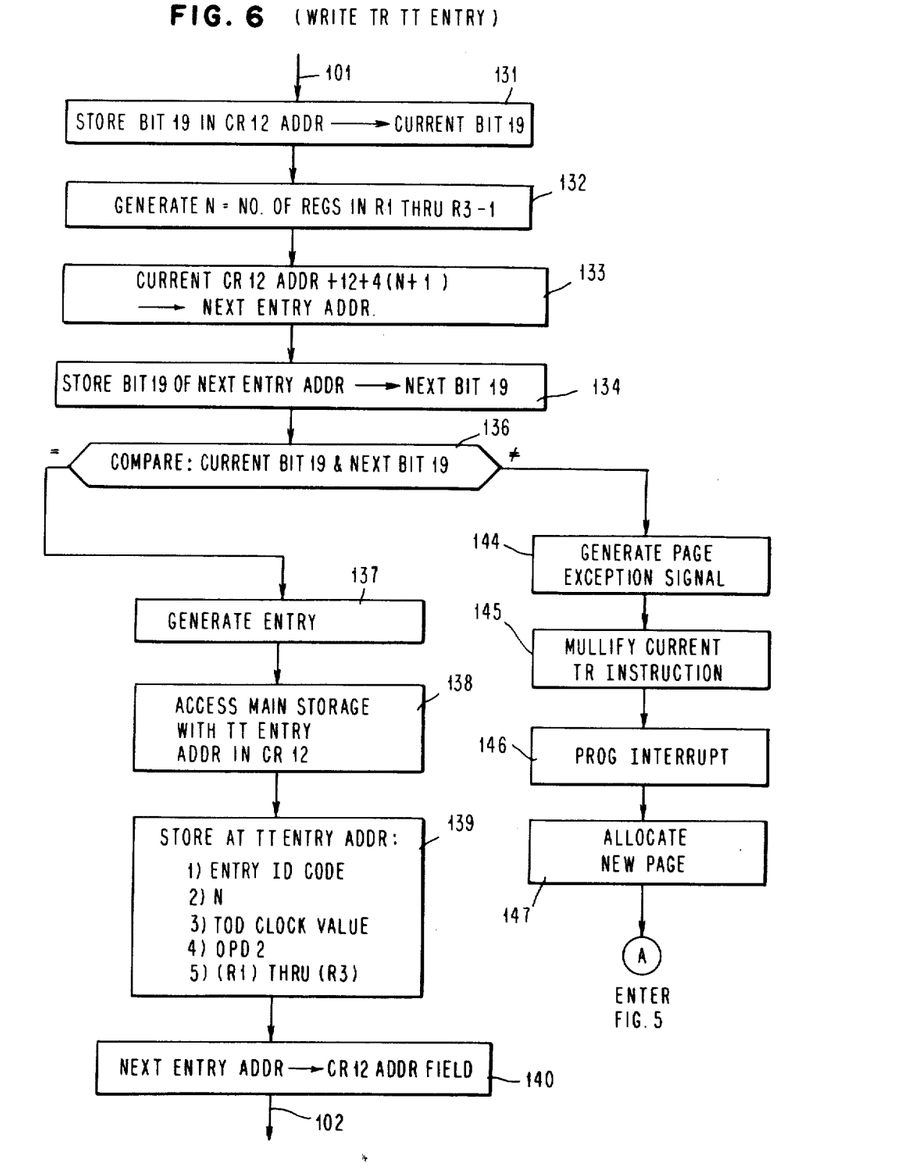
FIG. 6 illustrates substeps within step 103 in FIG. 5.

FIGS. 5 and 6 represent a microcode method used in the CPU shown in FIG. 3 for controlling the execution of implicit and explicit tracing. This execution process uses local store 44 to contain temporary results of IE operations. The microcode causes the transmission of selected contents of local store 44 to TR data register 26 for transmission to main storage for writing a trace table entry. FIGS. 5 and 6 apply to each CPU in a MP system and operate independently in each of the CPU's.

In FIG. 5, after the CPU is started, step 111 is entered to execute the next instruction, after which steps 112, 113 and 114 are entered to test whether the instruction is one of the types which can generate an implicit or explicit trace table entry. Step 112 tests to determine if it is any traceable instruction in the branch instruction set. Step 113 tests if it is a traceable instruction in the address space instruction set, and step 114 tests if it is a trace instruction. If all tests 112, 113, and 114 take their NO exits, step 111 is re-entered to execute the next instruction for the trace enablement condition. (All conventional instruction execution is also being done, but it is not pertinent to this invention and therefore is not described herein.)

However, if any of steps 112, 113 or 114 finds that the instruction is a traceable or trace instruction, then the YES exit is taken from the respective step, and the respective flag bit B, A, or E is tested to determine if it is set to a 1 state or 0 state. If the flag bit is set to a 0 state, then the NO exit is taken from the test step back to step 111 to execute the next instruction for its trace enablement condition.

However, if the tested flag bit B, A, or E is found to be in a 1 state, then the test step's YES exit is taken. If the YES exit is taken from the test step 116 or 117 for flag bit B or A, then step 104 or 105 is entered, respectively, for controlling the writing of a trace table entry in accordance with the corresponding format shown in FIG. 2 for the respective instruction being executed.

Steps 104 and 105 determine if the new entry having the length shown in FIG. 2 will exceed the end of the currently used page frame, and if so, step 104 or 105 will allocate a new page frame, which then becomes the address of the next entry in CR12.

Then step 106 or 107 each generate a respective entry ID code for the leftmost field of the entry to be written (as shown in FIG. 2). This entry ID code enables the length and type of each written trace table entry to be determined during later analysis of the table, since the written entries may have different lengths. Then step 108 or 109 writes the entry at the next entry location in the trace table.

However, if the YES exit is taken from test step 118 for flag bit E, then the second operand (OPD2) is addressed and fetched by step 119. When received on storage data bus out (SDBO) 43 in FIG. 3 into IE 23, it is put temporarily into local store 44 where the IE then executes step 121 to test the state of flag bit T to determine if it is in a 1 or 0 state. If in a 0 state, the trace instruction is disabled, and the NO exit is taken to step 111 to execute the next instruction for trace conditions. However, if flag bit T is in a 1 state, the YES exit is taken on path 101 to step 103 which writes the trace table (TT) entry. Then path 102 is taken to step 111 to execute the next instruction for trace conditions.

FIG. 6 illustrates in more detail the substeps which comprise step 103 in FIG. 5. In FIG. 6, step 131 accesses a bit position in the address field in CR12 which corresponds to bit position 19 in the main storage absolute address designating the location for the trace entry intended to be made by the current trace instruction being executed on this CPU. This bit position 19 in CR12 is designated as current bit 19 in step 131, and it may be temporarily copied into local store 19.

Then step 132 generates a value N which is one less than the number of registers in the sequence defined by the R1 and R3 fields in the executing trace instruction. The sequence begins with R1 and ends with R3. R1 and R3 can each have any value from 0 through 15. The sequence will wraparound back to GR0 if R3 is less than R1. If R1 and R3 are equal, one general register is designated and N is zero. If R3 is equal to or greater than R1, then N equals R3 minus R1. But if R3 is less than R1, wraparound occurs and then N equals 16 minus R1 plus R3. Since N is one less than the number of registers specified by the R1 to R3 range in the instruction, it is necessary to add 1 to N in order to determine the number of registers in the range specified by the trace instruction.

The next step 133 generates the address of the next trace entry, which will logically follow the entry currently being made in the trace table. This next address is generated as the current TT address (obtained from CR12) plus 12 plus the product of 4 multiplied by (N plus 1). That is, the length of a trace table entry for an explicit trace instruction is always 12 bytes plus the variable GR content field. This is seen in the trace entry shown in FIG. 2, which illustrates bit positions, which must be converted to eight-bit bytes (ignoring parity) for the computation in step 133 (since addresses are in byte units).

Then step 134 stores the next bit 19 from this computed next entry address (generated by step 133) into local store 44 at a location called next bit 19.

Step 136 compares current bit 19 and next bit 19 in local store 44. This determines if the current trace entry to be written would exceed the end boundary of the current page frame being used in main storage. This is done in step 136 by the IE. If current bit 19 and next bit 19 are equal (which is the usual case), then there is space in the current page for the current entry to be written; and it will then be written therein by entering step 137. Then step 137 generates the current entry. This includes generating the entry ID code, which is done by the IE using the operation code and addressing mode resulting from the instruction being currently executed as an argument into a table of entry ID codes in local store 44. That is, each of the traceable instructions has an ID code which corresponds to its operation code except the traceable branch instructions which also require the branch-taken addressing mode. The accessed entry ID code in the table is then put into the ID code field (leftmost field) in the TT entry being formed in local store 44.

This entry being formed in local store 44 by step 137 for a trace instruction also receives the TOD value from the TOD clock 21 in FIG. 3.

Step 137 also inserts the value of N in the N field of the TT entry being formed in local store 44. Then step 138 accesses main storage. Then step 139 transfers the entry ID code, N field, TOD field, and second operand from local store 44 via the TR data register 26 and SDB register 31 to the CPU cache and then to main storage into the trace table.

Then step 139 transfers the contents of registers R1 through R3 as shown in the trace instruction format of FIG. 2. In this manner, the TT entry may be written as the next trace entry in the trace table.

Then step 140 takes the next entry address (which was generated and put into local store 44 by prior step 133) and transfers it from local store 44 into the next TT entry address field in CR12.

However, if step 136 found an unequal comparison (i.e. current bit 19 and next bit 19 are different), then step 144 is entered because the trace entry being generated will exceed the end boundary of the current page frame being used. That is, the trace table has run out of allocated space in real storage and more space must be allocated before the trace table can be extended by another entry. To do this, step 144 generates a page exception signal.

Then step 145 nullifies the execution results for the executing TR instruction such as by nullifying those areas in the local store generated by the trace instruction execution.

Then a program interrupt is taken by step 146, and step 147 enters the storage allocation program which then allocates a new page frame for the trace table. Step 148 loads the new page address into the CR12 next TT entry address field. Finally exit A is taken to reenter FIG. 5, wherein the microcode for the same TR instruction is restarted from its beginning after CPU control is transferred back to its program from the storage allocation program by the later loading a PSW that causes the transfer back. The re-execution of the microcode in FIGS. 5 and 6 occurs in the same manner as previously described, except that when step 136 is entered it will find that the entry will fit into the allocated page frame, and step 137 will be entered to cause the writing of the trace entry into the trace table at the new page address now in CR12.

It is understood that the microcode (i.e. firmware) process described herein could with relative ease by one skilled in the computer design arts be embodied solely in hardware or in any combination of microcode and hardware, and that the microcode form will vary in dependence on each particular support hardware design.

While there has thus been described and illustrated a specific embodiment of the invention, it will be clear that variations in the details of the embodiment specifically illustrated and described may be made therein without departing from the true spirit and scope of the invention as defined in the claims.

Having thus described our invention, what we claim as new and desire to secure by Letter Patent is:

1. A program tracing method for each CPU in a data processing system having at least one CPU, a main storage accessible to each CPU, each CPU having an instruction execution (IE) unit for executing instructions in programs dispatched for the CPU, the IE having control registers (CRs) and general purpose registers (GRs), the program tracing method comprising:

providing a tracing instruction having a particular operation code and one or more operands, locating the tracing instruction at predetermined locations in a program, decoding the operation code of each instruction received by the IE, providing a unique-enablement field in an operand of each tracing instruction for controlling the operation of each individual tracing instruction independently of the operation of other tracing instructions located at different locations in the programs, the unique-enablement field being selectively set to a state which controls whether or not a trace-table entry is generated for each individual tracing instruction, determining for the CPU a trace-table-entry address, the trace-table-entry address locating an available trace table entry for the CPU, allowing the insertion of a trace-table entry in the CPU trace table for an executed trace instruction only when the unique-enablement field for an individual trace instruction being executed by the IE is set to an enabled state.

2. A program tracing method as defined in claim 1, the program tracing method further comprising:

accessing the trace instruction operand containing the unique-enablement field as a storage operand in main storage.

3. A program tracing method as defined in claim 2, the program tracing method further comprising:

allocating fields in one or more CRs in each CPU, including a CPU-tracing-instruction enablement field and a field for the trace-table-entry address, the trace-table-entry address field locating where a next entry is to be written in the trace table by the CPU, setting the CPU-tracing-instruction enablement field to a state that controls the enablement or disablement of all tracing instructions executed in the CPU, decoding each instruction being executed by the IE to indicate if it is a trace instruction; and if found to be a trace instruction, testing if the CPU-tracing-instruction enablement field and the unique-enablement field for the individual tracing instruction are both set to enabled states, inserting a trace-table entry into the trace table at the trace-table-entry address when the decoding and testing steps indicate a trace instruction is being executed and the unique-enablement field and the CPU-tracing-instruction enablement field are both in enabled states, and not interrupting the program being traced for executing the trace instructions.

4. A program tracing method as defined in claim 3, the program tracing method further comprising:

generating a content for a trace entry when the decoding step finds a trace instruction, including generating an entry identifier field for designating which of plural types of trace entries is represented by the respective trace instruction.

5. A program tracing method as defined in claim 4, further comprising:

storing of at least part of an operand of an enabled trace instruction into the trace entry being generated by the generating step.

6. A program tracing method as defined in claim 4, further comprising:

detecting by the IE of a value in a class field in the storage operand of an executing trace instruction, a trace mask register in each CPU for being set with a class mask provided by a user of the data processing system, mask fields in the class mask in the trace mask register respectively controlling class enablement of respective tracing classes for the respective CPU, locating by the IE of a mask field in the trace mask register at a location dependent on the value of the class field provided by the detecting step, sensing the state of the mask field located by the locating step to find if the tracing instruction is class enabled or class disabled for the executing trace instruction, inserting a trace entry into the trace table when the class enablement of the sensing step and the enablement conditions of the testing step all exist for the executing trace instruction.

7. A program tracing method as defined in claim 4, further comprising:

placing a current time-of-day (TOD) value into a field in the trace entry being generated by the generating step for an executing trace instruction, the TOD value being obtained from a TOD clock in the system.

8. A program tracing method as defined in claim 4, further comprising:

placing the content of a general register (GR) in a trace entry being formed by the generating step for an executing trace instruction.

9. A program tracing method as defined in claim 4, further comprising:

placing the content of a general registers (GRs) by the IE in the trace entry being formed by the generating step, the GRs being specified by a GR operand field in an operand of the executing trace instruction.

10. A program tracing method as defined in claim 9, further comprising:

further placing a GR count field having the number of GR fields in the trace entry being generated by the generating step.

11. A program tracing method as defined in claim 10, further comprising:

executing a separate program on each CPU in an MP with independent enablement control over the program tracing method in each CPU in the MP.

12. A program tracing method as defined in claim 4, further comprising:

the allocating step also allocating a plurality of CPU-tracing-control flag fields in one or more CRs, the CPU-tracing instruction enablement field being one of the CPU-tracing-control flag fields, each other CPU-tracing-control flag field being associated with another instruction in a CPU instruction set not primarily defined to perform a tracing function, the generating step also generating a trace entry when the testing step indicates an executing instruction is an instruction having an associated CPU-tracing-control flag field in an enabled state, and the inserting step implicitly inserting a trace entry into the trace table at the trace-entry-address when the associated CPU-tracing-control flag field is set to an enabled state.

13. A program tracing method as defined in claim 12, further comprising:

the generating step also forming an entry identifier code field corresponding to an operation code for an executing instruction having an associated CPU-tracing-control flag field in a CR, the enabled flag field being either the trace-instruction-control flag field or the traceable instruction flag field, the inserting step also placing the entry identifier code field in the trace entry to allow later identification of different types of instructions putting trace entries into a trace table.

14. A program tracing method as defined in claim 13, further comprising:

the allocating step also providing a branch-instruction tracing-control field as one of the CPU-tracing-control flag fields, the branch-instruction tracing-control flag allowing the implicit tracing of at least a subset of different types of branch instructions, the generating step generating plural branch-instruction identifier codes corresponding to the operation code for an executing branch instruction if a branch is taken by the branch instruction.

15. A program tracing method as defined in claim 13, further comprising:

the allocating step also providing an address-space flag field as one of the CPU-tracing-control flag fields, the address-space tracing-control flag field enabling the tracing of at least a subset of address space control types of instructions.

16. A program tracing method as defined in claims 10, 14 or 15, further comprising:

the allocating step respectively providing one bit position for each of the CPU-tracing-control flag fields in the one or more CRs.

17. A program tracing method as defined in claim 15, further comprising:

storing the state of a page-boundary bit position found in the trace table entry address in the tracing-control CR after the testing step detects an executing instruction to be a trace instruction or an implicitly traceable instruction which has a corresponding flag field enabled in a CR, computing by the IE of a length of a trace entry for the executing trace instruction, adding the length found by the computing step to the trace-entry address currently in the CR to obtain a next entry address to be put into the CR if the current entry address in the CR can be used, also storing the state of a page-boundary bit position found in the next entry address obtained from the adding step, comparing the states of the page-boundary bit positions obtained by the storing and also storing steps, performing the inserting step if the comparing step finds equality between the page-boundary bit positions, whereby the trace entry being made by the inserting step will not cross a page boundary.

18. A program tracing method as defined in claim 17, further comprising:

signalling a page-boundary crossing if the comparing step finds inequality between the page-boundary bit positions, nullifying the execution for the instruction being executed to nullify the instruction results in response to the signalling step, interrupting a program containing the instruction being executed, initiating a storage allocation program to assign another page frame to the trace table, inserting an address origin of the another page frame into the tracing-control CR as the next entry address for the trace table, restarting the execution of the nullified instruction after another page frame is assigned by the storage allocation program responding to the initiating step, whereby the next tracing entry in the trace table for the CPU is inserted at the beginning of the another page frame at the address of the trace-entry-address field in a CR.

* * * * *